US012485815B2

United States Patent
Popiel et al.

(10) Patent No.: US 12,485,815 B2
(45) Date of Patent: Dec. 2, 2025

(54) PATTERN-BASED INTELLIGENT PERSONALIZED CHOREOGRAPHY FOR SOFTWARE-DEFINED VEHICLE

(71) Applicant: GM GLOBAL TECHNOLOGY OPERATIONS LLC, Detroit, MI (US)

(72) Inventors: Luke J. Popiel, Oxford, MI (US); Srinath Venkata Pendikatla, Novi, MI (US); Anthony J. Sumcad, Rochester Hills, MI (US); Gaurav Talwar, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 297 days.

(21) Appl. No.: 18/310,169

(22) Filed: May 1, 2023

(65) Prior Publication Data
US 2024/0367580 A1 Nov. 7, 2024

(51) Int. Cl.
*B60Q 1/26* (2006.01)
*G06F 16/907* (2019.01)
*G06Q 30/06* (2023.01)
*G06V 20/58* (2022.01)

(52) U.S. Cl.
CPC ............ *B60Q 1/26* (2013.01); *G06F 16/907* (2019.01); *G06Q 30/06* (2013.01); *G06V 20/58* (2022.01); *B60Q 2400/00* (2013.01)

(58) Field of Classification Search
CPC ...... B60Q 1/26; B60Q 2900/50; G06V 20/58; G06V 20/46; G06Q 30/06; B23Q 17/249
See application file for complete search history.

(56) References Cited

U.S. PATENT DOCUMENTS

| | | | | |
|---|---|---|---|---|
| 10,447,393 | B2* | 10/2019 | Liu | H04L 9/0852 |
| 11,562,574 | B2* | 1/2023 | Pitale | G06F 18/2433 |
| 2005/0215239 | A1* | 9/2005 | Kopra | H04L 65/1101 |
| | | | | 455/414.1 |
| 2011/0246495 | A1* | 10/2011 | Mallinson | H04N 21/4788 |
| | | | | 709/204 |
| 2020/0346598 | A1* | 11/2020 | Boston | G06F 8/65 |

* cited by examiner

*Primary Examiner* — Christian Chace
*Assistant Examiner* — Minato Lee Horner
(74) *Attorney, Agent, or Firm* — Quinn IP Law

(57) ABSTRACT

Vehicles, systems and methods for acquiring a choreographic light pattern not previously available to the vehicles are presented. In some aspects, a target vehicle includes a processing system therein, an input interface coupled to the processing system and accessible to a user, and one or more image or other sensors positioned for capturing data from a source vehicle emitting a light pattern of interest. The processing system may scan and record a light pattern emitted by a portion of another vehicle in a line of sight of the vehicle. The scan uses data from the sensors and pattern recognition code. The identified light pattern is converted into metadata and transmitted to a central database. If the transmitted pattern is available and compatible with the target vehicle, the database may send a prompt to the target vehicle to download or purchase the pattern.

20 Claims, 6 Drawing Sheets

300 ↘

302 —
```
{
  "Pattern_Id" : "1089",
  "AVAS Correlation" : "Yes",
  "outcome" : {
    "Location" : "Tail Lamps",
RGB: (86.3,7.8,23.9)
    "entities" : {
      "Tail Lamp" : {
        "Time Lapse" : "120 ms",
        "Geometry" : "Elliptical Contours"
"Recommended Musical Resource" - "Fur Elise"
      }
    },
    "confidence" : 0.997
  }
}
```

*Fig-3*

PATTERN-BASED INTELLIGENT PERSONALIZED CHOREOGRAPHY FOR SOFTWARE-DEFINED VEHICLE

INTRODUCTION

Vehicles are beginning to adopt lighting choreographic effects, particularly on flagship and more recent electric vehicles. The patterns that are developed may signify a hallmark of the brand or the specific model. One such example includes a signature light pattern on the grill of a vehicle. Other portions of the vehicle may also emit visual choreographic effects.

These light patterns are unfortunately "stock" and immutable. That is, they are originally sourced from the vehicle using the available combination of hardware and executable code built or programmed into the vehicle during manufacture. As such, the light patterns cannot be reproduced on vehicles that lack these features. Further, the patterns, being hardwired and encoded into a vehicle during production, cannot be modified or augmented with user-specific choreographic effects.

SUMMARY

Apparatuses, systems and methods are disclosed that enable a driver in a vehicle, using an interface available to the user and a processing system executing pattern recognition code, to acquire and selectively emit a matching set of choreographic effects at a selected portion of the vehicle. The processing system is further configured to adopt and modify the initial light pattern with additional or unique features. For example, a vehicle that does not initially possess a desired custom choreographic pattern may leverage its system of image and other sensors together with the vehicle's pattern recognition code to target a source vehicle emitting a choreographic light pattern of interest to the driver. Responsive to the driver's selection from an input interface, the vehicle's processing system may initiate a scan to record the light pattern. In some examples, the scan may include using acoustic and other vehicle sensors to identify and capture accompanying sounds or other effects (e.g., the use of smart glass, etc.). The processing system may then use the pattern recognition code to interpret the recorded patterns and convert them to metadata.

The vehicle may transmit the metadata using a suitable network protocol over a wireless network to a central server or database. The server may search an accessible memory to discover whether the coveted pattern exists in the central server or database, for example. If the server determines that the choreographic effects in question are both available in an accessible memory and functionally compatible with the inquiring vehicle, the server may prompt the target vehicle to download and/or purchase the pattern.

The vehicle's infotainment system may include an interface having the input interface and an output interface. Once the server transmits a prompt to the vehicle's output interface (e.g., a touchscreen) identifying the availability and cost of the visual choreographic package for use or purchase, the driver may make a selection from the input interface (which may be the touchscreen or separate switches, for example) to connect to an online system or engage in a live call to consummate the purchase or acquisition of the pattern. In addition, in some examples, the user may subsequently customize the acquired light pattern with added acoustic patterns and other features. This customization may be accomplished in a comparable manner, for example, using acoustic sensors to acquire a sound that the processing system may combine and synchronize with the acquired light pattern. The result in this example is the generation of a customized light pattern and any associated effects.

In one aspect of the disclosure, a vehicle includes a body having a processing system therein, an input interface coupled to the processing system and accessible to a user, and an image sensor positioned on the body for capturing data from a source. The processing system is configured to initiate, responsive to user input from the input interface, a scan for identifying and recording a choreographic light pattern emitted by an exterior portion of another vehicle in a line of sight of the vehicle. The scan uses data from the image sensor and pattern recognition code. The processing system is configured to convert the identified light pattern and relevant attributes thereof into metadata. The processing system is also configured to transmit, via a wireless transceiver coupled to the processing system, the metadata to a central database to determine whether a matching light pattern exists in the database. The processing system is further configured to receive, via the wireless transceiver, data identifying that a match in the database exists for prospective acquisition by the processing system and selective emission by the vehicle. In other cases, the processing system may receive data identifying that no match is present, or that the effects are incompatible with the requesting vehicle.

In various embodiments, the relevant attributes to the identified light pattern include one or more of accompanying sound effects, use of Smart Glass, lighting location, lighting event, an animation including a category and time window thereof, hue information, brightness, inter-step time lapse, orientation, or geometrical pattern. In some embodiments, when the data indicates that the matching light pattern exists, the processing system is configured to receive information identifying that the matching light pattern is compatible, and available for use, with the vehicle. The received information identifying that the matching light pattern is compatible with the vehicle may be based on vehicle make and model data archived in a memory accessible to the central database.

In various embodiments, responsive to a prompt received via the wireless transceiver from the central database, the processing system is further configured to initiate, based on the user selection via the input interface, a purchase, lease, or when available, a cost-free acquisition of the matching light pattern from the central database for use on the vehicle. The processing system may further be configured to download data including the matching light pattern from the central database and to emit, responsive to the user instruction received from the input interface, the matching light pattern on an exterior portion of the vehicle using lights positioned at an orientation and location specified by the downloaded data. The processing system may further be configured to embed the metadata identifying the light pattern to the central database in a JSON payload object or another object.

In some examples, the processing system may include a mobile device configured to execute one or more mobile applications directed to the scan of the other vehicle and to communications with the central database. In these example embodiments, the mobile device is electrically coupled with the image sensor. The input interface may be a touchpad or touchscreen of the mobile device, and/or a series of knobs, switches, buttons, levers, or similar components. The metadata may further include one or more colors mapped by the processing system to lights in the light pattern, a relative position of the light pattern including whether the light pattern is in a front or rear of the other vehicle, or periodic changes to the pattern. In some examples, a duration of the scan of the light pattern emitted from the other vehicle may be selected by the user from the input interface. The scan for recording the choreographic light pattern may include use of image detection with one or more pattern recognition features.

In another aspect of the disclosure, a system includes a source vehicle configured to emit an exterior choreography effect including a light pattern from an external surface portion thereof. The system further includes a target vehicle not presently configured to emit the light pattern. The target vehicle includes a processing system encased therein. The driver of the target vehicle witnesses the light pattern emitted from the source vehicle. Responsive to the processing system receiving an instruction from the driver via an input interface, the processing system initiates a scan of the source vehicle using at least one image sensor to capture a representation of the light pattern from the source vehicle while the target vehicle is in a line of sight of the source vehicle. The system also includes a server to which the processing system is configured to transmit metadata including the captured representation of the light pattern from the source vehicle over a wireless network. The server uses the metadata to conduct a search for a match to the captured representation in a memory, and in response to finding a match, the remote server is configured to determine whether the light pattern found in the memory is compatible for use with the target vehicle.

In various embodiments, the target vehicle further includes one or more acoustic sensors configured to detect one or more choreographic sound effects accompanying the light pattern during the scan. The processing system may be configured to convert information defining the sound effects along with the light pattern into the metadata for transmission to the server. The server may in some cases be configured to determine whether the light pattern and any accompanying choreographic effects are available to the server in a memory, are compatible with the target vehicle, and are available for use or rental by, or sale to, the driver.

In various embodiments, upon determining that the light pattern and accompanying choreographic effects in the memory are available for use or rental by, or sale to, the driver, the server is configured to communicate with the processing system of the target vehicle to prompt the driver to pay a rental or purchase fee where needed and to download the light pattern found in the memory. After the download, the processing system may be configured to emit the light pattern upon receiving an instruction from the driver via the input interface. The processing system may use lights affixed to or inset in a corresponding external surface portion of the target vehicle along with attributes from the download relevant to execution of the pattern. In some cases, the light pattern may be emitted from an interior portion of the vehicle.

In various embodiments, the processing system is configured to identify the light pattern emitted by the source vehicle based on a plurality of attributes of the light pattern. The processing system may use the pattern recognition code to convert the light pattern to metadata including the captured representation of the light pattern conveyed to the server. In one example, the target and source vehicles represent the same make and model. In some embodiments, the image sensor in the target vehicle includes one or more cameras or sensors electrically coupled to the processing system for enabling the processing system to capture a representation of the light pattern from the source vehicle.

In various embodiments, the processing system is included in one or more electronic control units (ECUs), or microcontroller units (MCUs) coupled to a body of the vehicle and configured to receive data from the one or more cameras or sensors during initiation of the scan of the source vehicle to capture the representation of the light pattern. In other examples, the processing system is at least partly within a mobile device. The mobile device may include a memory for storing executable code and a processor that, when executing the code, causes the mobile device to receive data from the one or more cameras or sensors for enabling the mobile device to capture a representation of the light pattern from the source vehicle, to forward the captured representation to the central server using a mobile network, to receive a response from the central server identifying whether a matching light pattern is found, and to apply the light pattern to the target vehicle when the light pattern is available from the central server and compatible with the target vehicle.

In still another aspect of the disclosure, a method of a target vehicle includes detecting a source vehicle emitting a choreographic effect including a light pattern from a position on or within the vehicle. The target vehicle records data relevant to the light pattern from one or more cameras or sensors in a line-of-sight of the source vehicle. The target vehicle identifies the light pattern using the data and pattern recognition code for interpreting the light pattern based in part on an orientation of emitted light. The target vehicle converts the light pattern to metadata and transmits the metadata to a central server to determine if a match exists. The target vehicle receives a prompt when a match is found. The prompt indicates whether the light pattern is compatible with the target vehicle and is available for download, trial or purchase.

The above summary is not intended to represent every embodiment or every aspect of the present disclosure. Rather, the foregoing summary merely provides examples of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes the various combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, explain the principles of the disclosure.

FIG. 3 is an example JSON payload object according to an embodiment.

Figure 1:
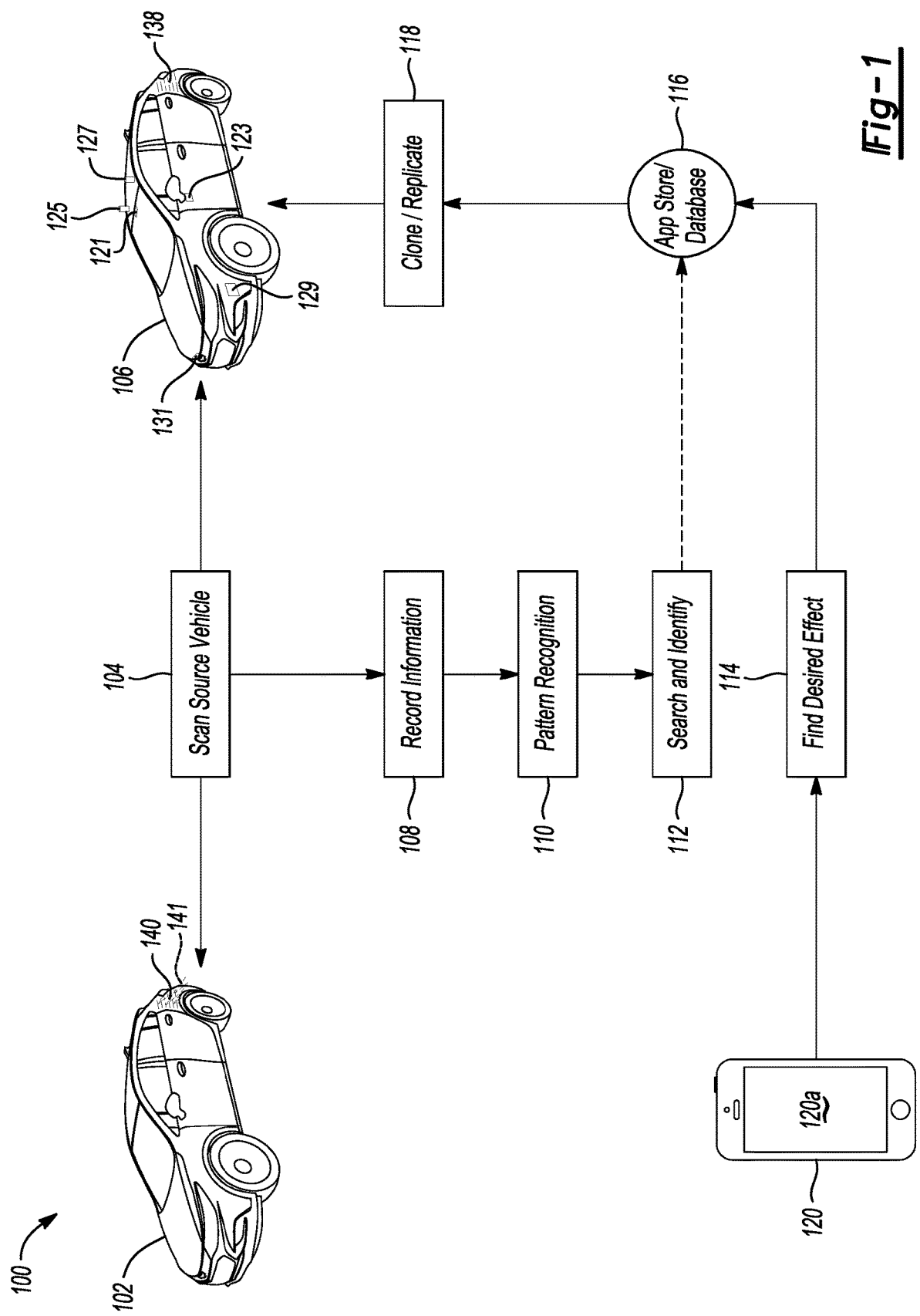
FIG. 1 is a conceptual flow diagram of a target vehicle scanning a choreographic light pattern from a source vehicle according to an embodiment.

The appended drawings are not necessarily drawn to scale and may present a simplified representation of various features of the present disclosure, including, for example, specific dimensions, orientations, locations, and shapes. In some cases, well-recognized features in certain drawings may be omitted to avoid unduly obscuring the concepts of the disclosure. Details associated with such features will be determined in part by the particular intended application and use case environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising." "having." and the like shall mean "including without limitation." Moreover, words of approximation such as "about." "almost." "substantially." "generally." "approximately," etc., may be used herein in the sense of "at, near, or nearly at," or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

With the advent of the software-defined vehicle and leveraging the modality by manufacturers of over-the-air (OTA) updates and the so-called "connected vehicle" (CV), a target vehicle may scan, record and identify choreographic light patterns and other customizations found by the target vehicle in another equipped vehicle emitting the pattern (e.g., a source vehicle). The target vehicle may transmit identified choreographic patterns to a central server or database. If the server finds a matching choreographic pattern in the database or an accessible memory and determines that the pattern is compatible with the target vehicle, the server (or an affiliated online store) may share the pattern with the target vehicle. The pattern may in turn be cloned on the target vehicle that initially performed the scan. Further, in another aspect, the server or database may match the choreographic pattern with other customizations, either as suggested by the server or as requested by the user, potentially using a trial, purchase, or related financial model.

In some embodiments, the matching light pattern may be shared with the target vehicle using an OTA update, which may be provided by the manufacturer or an affiliate for execution on the target vehicle. As noted, the target vehicle may be an electric vehicle (EV) or a software-defined vehicle, the latter of which is a vehicle whose features are principally implemented through software in one or more processors encased in or coupled to a body of the vehicle. The OTA updates may be one of the tools used to provide subscription services to a driver. The target vehicle may be a CV, which is a vehicle that is capable of communicating with other vehicles or a central server or database using the Internet. The user (which refers to the owner or driver of the target vehicle) may establish a subscription with the manufacturer to acquire various compatible choreographic customizations using the CV capabilities and OTA transmissions. The enhanced telematics of EVs may facilitate the scanning of the source vehicle. For example, a processing system may use cameras or image sensors in concert with proprietary pattern recognition code to identify or implement customizations that the EV theretofore lacked. The pattern recognition code may use the sensor data to scan, record, and identify the choreographic light pattern using a number of different attributes.

A non-exhaustive list of these attributes may include (1) the lighting location (such as whether the light pattern is emitted from the tail lamps, head lamps, grill pattern, Smart Glass on the vehicle, or some other exterior or interior portion of the source vehicle), (2) the purpose of the lighting event (such as whether the light pattern is related to or indicative of a particular vehicular action or phenomenon like braking, use as night tail lamps, turn signals, hazard lights, or the like), (3) whether or not the light pattern is part of an animation, (4) hue information (such as red-green-blue (RGB) levels, hyperspectral imaging (HSI) estimates, etc.), (5) light brightness (measured often in lumens), (6) animation category (such as blinking, cumulative string lighting, snap flash, and other categories, if an animation is involved), (7) total time window for the pattern or animation, (8) an inter-step time lapse, (9) geometrical pattern of the light pattern, including in embodiments where the lights are parallel LED strings (such as contours, Acute Incidence Slanted Lines, etc.) and (10) other features not specifically referenced. In some cases, one or more of these attributes may not be relevant to the pattern. Further, in some examples, the light pattern may include a plurality of patterns combined across time and space on the relevant portion of the source vehicle in a more complex combination of patterns. Many of these attributes may be attained by pattern recognition code (e.g., identified colors or patterns of an animation, a sequence of time intervals, etc.) in concert with the data from the relevant sensors, In various aspects herein, the vehicle includes a body, which may be considered an enclosure within the vehicle frame. The vehicle described herein includes a processing system, described in greater detail below. The processing system may be located in an electronic control unit (ECU) or a microcontroller unit (MCU) of a vehicle. In other cases, the processing system may be distributed across a plurality of processing components at distinct locations in the vehicle body. The processing system according to various embodiments includes a local memory storing the pattern recognition code or a suite of algorithms that are germane to performing certain tasks enumerated herein. The target vehicle also may include a plurality of sensors. These sensors may include, for example and without limitation, cameras (still and video), short and long range light/laser detection and ranging (LIDAR) sensors and radio detection and ranging (RADAR) systems, motion detectors, collision alert sensors, proximity sensors, air flow sensors, engine speed sensors, throttle position sensors, and many other types. In a straightforward recognition process of a light pattern emitted by a source vehicle in a vicinity (i.e., a line of sight) of the target vehicle, the cameras may be utilized as the main data collectors. In other cases, acoustic sensors may be used to listen for accompanying sounds made by the source vehicle as a part of the choreographed event. In addition to the various sensors located on the vehicle, the vehicle may communicate with other vehicles using one or more wireless networks, such as in a vehicle-to-vehicle (V2V) or a vehicle-to-everything (V2X) configuration. For example, the target vehicle may inquire from the source vehicle, or a third-party vehicle, about details of the pattern. The vehicle may also obtain information from remote sources over a wireless network, such as a proprietary network used by a particular manufacturer, or another wireless network to obtain information about location, weather, public alerts, and information that may otherwise affect the scan. This information may include the target vehicle wirelessly transmitting data describing the pattern retrieved from the source vehicle to the server/database. This information may also include OTA transmissions that include the light pattern to the target vehicle, whether the information is transmitted automatically or upon a request of the user via the input interface.

The processing system may initiate a scan of the source vehicle, which typically takes place while the target and source vehicles are in a line of sight such that the sensors and cameras of the target vehicle may collect and analyze information using the one or more sensors, in some cases together with telematics information from other vehicles or remote sources. While the source vehicle is scanned, the processing system may record the data from the sensors, e.g., by storing it in a memory included as part of the processing system, or a separate memory. Using this data, the processing system may execute the pattern recognition code and other types of code that use the sensor data to identify one or more attributes of the pattern, such as its geometry, relative orientation, colors emitted, brightness of the colors, behavior of the emissions of light over time, etc. With these recognized attributes, the pattern recognition algorithm(s) may have the requisite knowledge to identify the light pattern. As described below, the scanning actions may be initiated by a user through an input interface.

In some embodiments, the code is executed on a mobile device, which acts at least in part as the processing system. The input and output interface in this example may include the touchscreen of a smartphone, for example. The mobile device may use a cable plugged into a vehicle port to obtain sensor data. In other embodiments, the mobile device may have an application configured to obtain sensor data wirelessly.

After the choreographic presentation including the light pattern emitted by the source vehicle is interpreted by the processing system of the target vehicle, the target vehicle may proceed to interface wirelessly with the central server, as discussed in greater detail below.

In short, by combining in-vehicle hardware (e.g., sensors, LIDAR, RADAR, cameras, etc.) with the algorithmic suite of pattern recognition code and (in some embodiments) external data sources, the target vehicle may interpret the relevant pattern and proceed to take steps at the direction of the user or driver to acquire and customize the pattern on the target vehicle.

FIG. 1 is a conceptual flow diagram 100 of a target vehicle 106 scanning a choreographic light pattern 141 from a source vehicle 102 according to an embodiment. It is assumed for the purposes of this illustration that the light pattern 141 is being emitted by an array of light-emitting diodes (LEDs) 140 located on the driver's side of the vehicle at a posterior surface of the automobile, although other light technologies may be used. In the event the light pattern 141 is symmetric, meaning that it is concurrently being emitted in similarly-positioned LEDs on the opposite side of the source vehicle 102, the target vehicle 106 may in one example use its pattern recognition features and sensor data in the line of sight of the target vehicle 106 to extrapolate data sufficient to identify the pattern and its attributes on the other side of the source vehicle 102 (obscured from view in the figure).

Referring to FIG. 1, the target vehicle 106 may include several types of sensors. Different cameras 121, 123, and 131 may be strategically positioned on, or inset into, various parts of the surface of the body. Cameras in some embodiments may also be placed in the rear of the target vehicle 106 to enable the driver to perform scans using a wider viewing angle. For example, the source vehicle may be somewhere behind the target vehicle and visible to the driver in the rear view mirror. Cameras 121, 131 and 123 may be video cameras for recording the emitted pattern over time. Specialized image sensors may include still cameras to capture relevant attributes of the pattern at a high focus at an instant in time.

In addition to cameras 121, 131 and 123, in some embodiments, the vehicle may include other types of sensors that may be used to complement the data captured by the camera data. For example, LIDAR sensors 125 and 127 may be positioned on the target vehicle's roof. LIDAR sensors 125 and 127 are cylindrically shaped devices that may emit light as a pulsed laser to measure distances to the relevant portions of the source vehicle 102, such as the sensor array 140. Vertical LIDAR sensors 125 and 127 may be repositioned to a tilted position or horizontal position by a motor assembly located at their base or at a recess in the roof. LIDAR emits the light and calculates how long it takes for the beams to hit the array or surface and reflect back to the sensor. These "time of flight" measurements may be useful in some embodiments for very precisely mapping the surface from which the light pattern is emitted. Additionally, in the embodiment of FIG. 1, the target vehicle 106 includes a long range RADAR sensor 129 proximate the front bumper and another one (obscured from view) on the other front bumper. In addition to being used in separate functions (e.g., emergency braking), the RADAR sensor 129 may further complement the cameras by using radio waves to map the source of the light pattern. Target vehicle 106 also includes an array of LEDs 138 in the same relative position as the LEDs 140 in the source vehicle 102. This may be the case, for example, when the make and model of both vehicles 102 and 106 are identical (except that the LEDs 138 or other components of target vehicle 106 may be programmed with a different choreographic pattern, or with no pattern). The respective arrays 138 and 140 in the target and source vehicles 106 and 102 may be associated with some event or function, such as a sudden braking, an emergency or distress signal, or an alert to a driver of the presence of a nearby vehicle. In other cases, if approved, the light pattern 141 may be used for aesthetic purposes.

The process may be initiated by an input and/or output interface enabling the driver of the target vehicle 106 to make certain selections, e.g., from a touchpad including input icons. It is assumed that the target vehicle 106, whether or not the same make or model as the source vehicle 102, lacks the present choreographic pattern equipped for LEDs 140 in the source vehicle 102.

Initially, the driver in target vehicle 106 may be actively driving the target vehicle 106 on the roadway, when the driver spots the choreographic light pattern being emitted from the LED lights 140 at the rear portion of the source vehicle 102. It is noteworthy that the position of the LEDs (or other lights or components) is arbitrary here for example purposes, and the pattern may be emitted from a different portion of the vehicle, whether from a surface portion or an interior light pattern, if the latter is sufficiently visible. As another illustrative scenario, the target vehicle 106 may have included in memory certain light patterns for selective emission from the color LEDs 138, but not of the particular pattern 141 being emitted from lights 140 of the target vehicle 106. The driver may thereupon use a touchscreen, selector knob, switch, or other input interface to instruct the processing system to initiate a scan of the light pattern, as shown in logic block 104. The input interface and output interface may be positioned on a convenient portion of the dashboard or steering wheel. If the former, the input interface may be a touchpad that performs both input and output interface functions. In other embodiments herein, the pattern recognition and data gathering process may be facilitated by a mobile device such as smartphone 120, wherein the touchscreen 120a of the mobile device may constitute at least a part of the input interface.

Referring back to the scan referenced in logic block 104, a processing system encased or positioned in the body of the vehicle may receive instructions from the driver over a wired connection to initiate the scan of the light pattern 141. The instruction may potentially include a general direction or approximate coordinates of the light pattern emitted from source vehicle 102. The approximate coordinates may be obtained based on the driver's use of a visual tool run via executable code on a processor manipulating the touchscreen or the underlying infotainment system.

Based on the input received from the driver via the input interface, the processing system may, at logic block 104, continue the scan of the pattern emitted from LEDs 140 of source vehicle 102. In one embodiment, the processing system is coupled to the various sensors positioned on the car. The processing system may instruct one or more of the cameras 121, 123, or 131 in a line of sight of the emitted light pattern to perform the scan by recording the data characterizing the emitted light pattern, as shown in logic block 108. For example, the data streams from one or more image sensors or cameras may be passed to the processing system in the target vehicle 106. As the processing system receives the data, it may store the data in a cache or another type of memory (FIG. 6) while the processing system executes code that interprets the data. The code may include different executable algorithms for pattern recognition, as shown in logic block 110. The processing system may, for example, use various algorithms to retrieve and recover from the data stream one or more attributes of the patterns, including position, brightness, colors, changes to the pattern over time, orientation of the pattern, source of the specific LEDs 140 emitting light at different time periods, the changing geometry of the light pattern 141, and the like. The processing system may combine data received from different sensors or sources, or it may concatenate the data over time to form longer data blocks. In some examples, the processing system may execute additional instances of pattern recognition code on the data (logic block 110) to identify additional attributes. The pattern recognition code may enable the processing system to stitch together a highly accurate representation of the light pattern 141 emitted from LEDs 140 of the source vehicle 102. In addition to the various pattern recognition routines, the processing system may also dynamically control the position and zoom of the cameras and image sensors so that they are targeting the correct points in space, especially when one or both vehicles are in motion and obstacles appear.

As noted above, in some embodiments, the processing system may use LIDAR 125 and 127, long-range RADAR 129, and other types of sensors to map the area at issue, statically or in or near real-time. The mapping can be used by the processing system to augment the data from the cameras 121, 123, or 131 or adjust the levels of the measured attributes (e.g., adjust the measured intensity of an LED based on its exact distance from the target vehicle 106 as mapped by LIDAR 125, etc.). After combining and adjusting the data, the processing system may employ further pattern recognition techniques to identify and store in memory a final data representation of the emitted pattern. (It is noteworthy that in some embodiments, the processing system may be coupled to other types of sensors in the event the choreographic pattern involves sounds and other attributes.)

Referring still to logic block 110, in addition to interpreting the recorded pattern, the processing system may proceed to convert the data in some cases to a more human-readable format suitable for transmission over a wireless network to a server or database. Several methods may be used to perform this technique, depending on factors like the type of executable code, the present format of the data, the backgrounds of the designers, and others. Each of these methods are deemed to fall within the spirit and scope of the present disclosure. In some embodiments discussed in more detail below, the processing system may convert the raw data into metadata using payload objects such as JSON objects. The processing system in this example encapsulates code into one or more such JSON objects. The JSON objects are one of several different methods that enable the processing system to transmit, using a transceiver coupled to the processing system (FIG. 6), the relevant metadata representing the light pattern 141 to an application store residing on a server or database 116 to download choreographic patterns in exchange for purchase or lease. The JSON payloads or related objects may easily enable the server at the app store/database 116 to execute a search for the identified pattern in the database, as reflected in logic block 112, by transmitting the metadata in the form of JSON objects or in another form over a wireless network to the server running the app store/database 116.

The app store/database 116 may in some examples be established and maintained by the manufacturer, or an affiliate of the manufacturer. The app store/database 116 may be in one or more remote locations, in some cases being distributed strategically across a geographical region. The database 116 may include a memory repository for storing large numbers of catalogued choreographic effects, whether the effects include light patterns, modified choreographic effects including the use of light and sound in an animation, or other types of attributes or variations for customizing choreographic effects. In some embodiments, the types of choreographic and light effects are catalogued based on the compatible make and model of the vehicle. It is anticipated that some newer electric vehicles and software-defined vehicles will have a larger number of discrete and diverse features, which may make them suitable candidates for customizing light patterns from the source vehicle 102 with separate sound effects, or different types of choreographic patterns. In some embodiments, the app store/database 116 may include a server that catalogues the various choreographic effect by the vehicular action or instance to which it is attributable. For example, as noted, a particular light pattern in a back end of a vehicle (or a roof or front end) may be relevant to a turn, a sudden braking, an acceleration, a distress message, or another event. In these cases, the light patterns may be less customizable, or not customizable. In other cases where the app store-/database 116 maintains choreographic patterns including light patterns for aesthetic purposes, such as internal animations in a vehicle, interior lighting, or exterior lighting deemed to preserve a vehicle's roadworthy nature, the app store-/database 116 may be able to combine various patterns and prompt the user to sell or otherwise acquire one or more such patterns to customize the target vehicle 106. In other embodiments, the customization (if it is done) is performed at the user interface level as a request to the app store/database 116.

Figure 2:
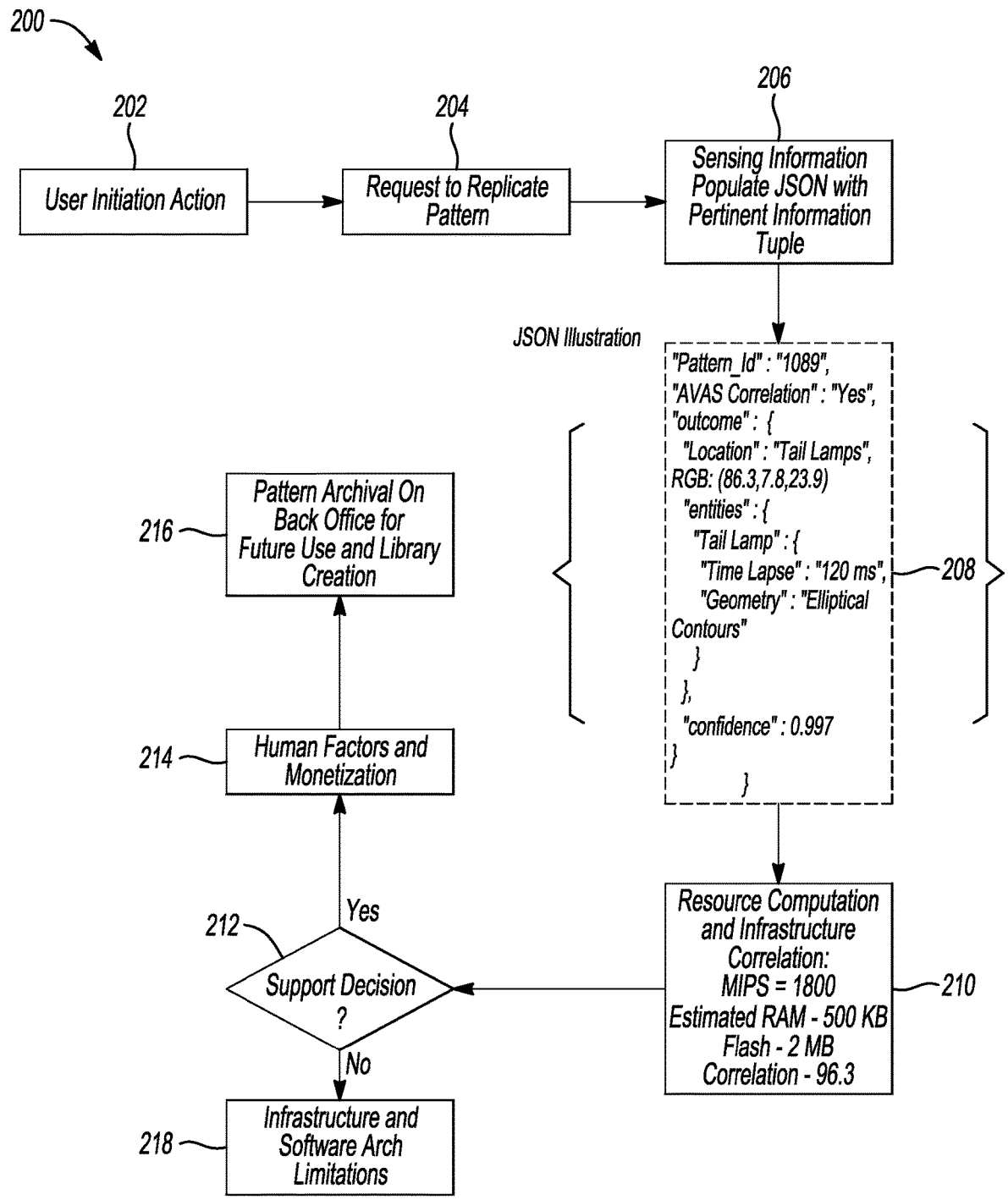
FIG. 2 is an example flow diagram of a target vehicle scan and the decision whether to archive a pattern of a target vehicle according to an embodiment.
Figure 6:
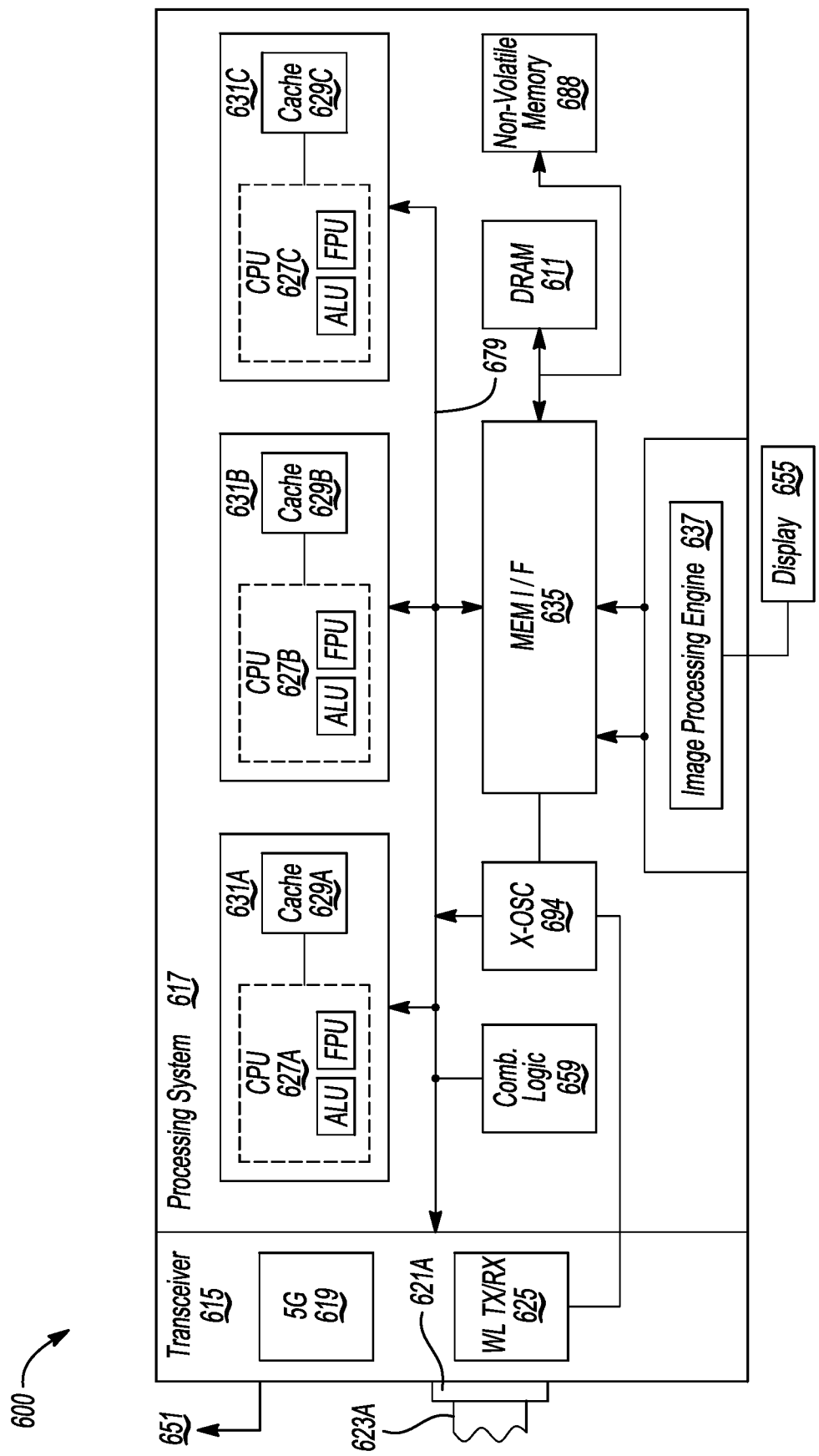
FIG. 6 is an example block diagram of a processing system encased in a body of the vehicle along with a transceiver and an image processing engine, in accordance with an embodiment.

With continued reference to logic block 112, the app store/database 116 receives the pattern 141 obtained by target vehicle 106 from source vehicle 102 to first determine whether the pattern is available in the database or is stored in memory that is accessible to the app store/database 116. It may be the case that the app store/database 116 does not have the code package for implementing the choreographic pattern in its inventory. In this case, the app store/database 116 may transmit a message to vehicle 106 indicating that the pattern is not available. In other examples, the server at the app store/database 116 may determine that the light pattern transmitted from the target vehicle 106 is, while available, not presently compatible with the target vehicle 106. These types of messages may be received at the transceiver of the target vehicle 106 and relayed by the processing system to the output interface for the driver to see (FIGS. 2, 6). In contrast, in examples where the server determines that the app store/database 116 has within its database the identified light pattern, the server may then send a prompt to this effect to the target vehicle 106, which is relayed to the output display. The contents of the prompt may differ. For example, if the pattern is mandatory for the target vehicle 106 to implement a needed attribute, the pattern may be free of charge. In other embodiments, where the light pattern is being used to customize the target vehicle 106 by the driver, the prompt (or a follow-up message to the prompt) may indicate that the associated code package for implementing the light pattern is available at the app store/database 116, and downloadable for a one time fee, a rental fee for a certain period, or another type of purchase depending on the financial model of the manufacturer.

In response to an affirmative input by the driver via the input interface of target vehicle 106, the app store/database 116 may deduct an amount from an account of the driver, if one exists on file, or it may connect the driver to a call center or online service, in which the driver may consummate the transaction. At this point, the driver may indicate to the app store/database 116 that he or she wishes to purchase and download the choreographic effect in question. The effect in the form of the needed data and code for emulating the patterns and attributes thereof may then be transmitted from the server at the app store/database 116 to the target vehicle 106, to be cloned or replicated (logic block 118) on the target vehicle 106 using the LED pattern 138 in this example. The net effect is that a vehicle that initially lacked the ability to emit a desired choreographic effect now has it cloned dynamically on the vehicle. In various embodiments, the driver may communicate further with the app store/database 116 for further options, such as purchasing sound effects to accompany the light pattern being purchased or acquired.

Other embodiments may involve the use of a mobile device in the vehicle instead of, or in addition to, the processing system present in one or more ECUs or MCUs. These embodiments may involve a combination of both. In the mobile device scenario, smartphone 120 is shown. In lieu of the major features of the transaction taking place in the vehicle-embedded processing system, the smartphone 120 may include one or more mobile applications designed to interface wirelessly (or via a plug-in socket) with the one or more image sensors and to execute code in the mobile application as pattern recognition code that first interprets and stores in memory the data streamed from the relevant cameras and sensors of the light pattern from LEDs 140 in a line of sight of the mobile device, and second, uses its own executable code to interpret the data and convert it into metadata identifying the attributes of the choreographic pattern in a manner similar to that described above. In this case, the mobile device 120 may then attempt at logic block 114 to find the desired effect by using a technique analogous with the processing system and transceiver encased in the target vehicle 106, as above. One advantage of this procedure is that the mobile application(s) in the smartphone may be downloaded directly from the app store, such that the two devices may be designed to use similar data and executable code. In addition, the mobile device may use its touchscreen as an input or output interface, much like the infotainment system on the target vehicle 106. Further, in some embodiments, the vehicle user or owner need not actually be present in the vehicle to identify a passing source vehicle 102 emitting a unique pattern. That way, the driver is not distracted by the details of the search and transaction. In the latter embodiment, the mobile device 120 may use its own internal cameras or image sensors. Alternatively, if the target vehicle 106 is nearby, the mobile application in the smartphone may be used to interact with the sensors (directly or via a processor) and obtain data streams from the target vehicle 106. The app store/database 116 may transmit and receive data in the form of metadata (e.g., JSON payloads) and perform functions as described above. In some embodiments, performing a scan for the initial light pattern 141 may involve some combination of the processing power of the smartphone 120 and the processing system in the vehicle. The user may have access to the relevant user-accessible features of the light pattern search via touchscreen 120*a* of the smartphone 120.

FIG. 2 is an example flow diagram 200 of a target vehicle scan and the decision whether to archive and monetize a received pattern from a target vehicle according to an embodiment. In some embodiments, the steps in FIG. 2 may be used by a manufacturer or affiliate to assess the computational needs of a choreographic pattern representation transmitted from a target vehicle that is not currently available, to determine whether there exists computational and infrastructure-related limitations rendering the light pattern incompatible with the target vehicle (or in some embodiments, with a class of target vehicles). Based on whether the infrastructure and software architecture limitations are excessive and incompatible with the target vehicle (or class thereof) having or lacking such limitations, the server may then decide whether to create the pattern and make the pattern available and for future use or sale.

Beginning at logic block 202, the user, which may be the driver or the vehicle owner (e.g., in the passenger seat), may initiate an action by selecting an input on the input interface of a target vehicle, e.g., positioning the cameras towards a design light pattern emitted by a source vehicle in a line-of-sight of the target vehicle to initiate a scan. The user may be prompted by the infotainment system or touchscreen to request that the target vehicle initiate a scan to produce metadata characterizing the light pattern, such as in embodiments described relative to FIG. 1. The user may elect to initiate the pattern replication request process by selecting the appropriate input at the available input interface, as shown in logic block 204.

Thereafter, as discussed in greater detail herein, the processing system of the target vehicle may use the cameras and other sensors to sense the information relating to the light pattern and to execute the pattern recognition code to identify/detect the light pattern and its pertinent attributes, including orientation, geometry, brightness, use of colors, special effects, animations, potential acoustic effects (e.g., wind chimes), and other relevant attributes as warranted. In the embodiment of FIG. 2, once the target vehicle's processing system stores the data in memory, the processing system may thereupon proceed to populate the JSON payload with the tuple, or ordered list, of pertinent information describing the light pattern and its attributes, as in logic block 206.

The embodiment of FIG. 2 shows an exemplary illustration of a JSON payload 208 created by a target vehicle and transmitted to a central server. The JSON payload 208 is populated with metadata transmitted from the target vehicle to the server. In general, the metadata may be used to find a matching pattern or, in some examples, to recommend another pattern if the pattern at issue is incompatible.

As shown in JSON payload 208, the "pattern identifier" provides both the source and destination of the transmission that the pattern in question is identified as 1089. The next item of metadata is whether the identified light pattern is Adaptive Visual Analog Scales (AVAS) correlated, which the processing system indicates in the affirmative. The AVAS is an available package of code which may be flexibly used for creating, configuring and scoring continuous and discrete analog scale formats. As an example of the utility of AVAS, the continuous format defines a sequence of visual objects rated along a solid line. The attributes of the solid line are scored as a ratio to distances from anchors along the line. A discrete visual format defines individual sources of visual emissions. AVAS provides attributes of these formats using a unique ID that is linked to stored scores for each attribute. AVAS is highly customizable and may assist in defining the details and attributes of the emitted light pattern from the relevant portion of the source vehicle.

With continued reference to the JSON payload 208 of FIG. 2, the "Location" entry signifies details regarding the position or orientation of the light pattern on the vehicle, and the color(s) in RGB of the emitted light. In this example, the light pattern is emitted from the tail lamps. The "outcome" indication represents the various definitions and attributes of the light pattern. The "entities" section of JSON payload 208 adds further attributes of the light pattern. For example, it states that for the tail lamp, the time lapse (e.g., pattern interval) is 120 milliseconds (ms), and the geometrical shape of the pattern includes elliptical contours. A "confidence" indication is 0.997. As shown, the JSON payload represents a straightforward pattern of human-readable characteristics. In other configurations, more complex tuples may be added to define a more sophisticated overall choreographic pattern, which may further include sounds, changing light patterns over time, changing colors, changing use of lights, animations, use of Smart Glass, and the like. Whatever the format used, the payload objects may also be written to ensure that the representative pattern is in compliance with specifications from the DMV or other entities.

As noted, the use of JSON objects represents just an example of certain aspects. The metadata may be presented using other techniques, including different file formats and data interchange formats. One advantage of JSON is that, because it utilizes human-readable text to store and transmit data objects, the contents of the pattern may be understood fairly readily by the receiving server or dataset. That said, other script objects and data encapsulation techniques may be used without departing from the spirit or scope of the present disclosure.

Once the tuples are concatenated to the JSON payload 208 representing the subject metadata, the processing system and the transceiver (FIG. 6) may encapsulate the JSON payload 208 in data packets or streams having a format compatible with the type of wireless network used for the transfer (e.g., a 4G, 5G network, a metropolitan area network, a proprietary network used by the manufacturer or its affiliate, or the like).

At logic block 210, the server or database may perform a resource computation (based on the specifications of the target vehicle) and infrastructure correlation. For example, the server may compute the estimated number of millions of instructions per second (MIPS) needed by the target vehicle's processing system to execute the pattern identified in the JSON object 208. The server may also estimate the amount of random access memory (RAM) needed to store the information used in the pattern, which in this example is about 500 kilobytes (KB). The server may similarly determine the amount of flash memory needed, which in this case is about two (2) megabytes (MB), and a correlation of 96.3.

In some embodiments, if the pattern is unavailable at the server at logic block 212, the server may use the information from logic block 210 along with the resource metadata in the JSON payload 208 to ascertain whether the server should make the pattern available for larger scale use and purchase in the future. In these embodiments, the server may perform the resource assessment to determine if the light pattern is compatible with a class of target vehicles in making a larger scale economic decision whether to clone the pattern for future sale and use.

If the server determines at logic block 212 that the target vehicle lacks the requirements to emit the light pattern, or that the computational resources are otherwise excessive, the server in one embodiment may identify the specific infrastructure and software architecture limitations of the target vehicle, as in logic block 218. Software architecture limitations may pertain to the needed but unavailable processing power (e.g., in Mega-Instructions per second, or MIPS) for executing the light pattern, and in some embodiments, reconstruction by the processing system of the lighting pattern once the target vehicle learns the pattern from the source vehicle. As an example, limitations may arise when the processing system of the target vehicle cannot create an instance of the reconstructed pattern in virtual memory of the target vehicle needed to emit the choreographic pattern. The server may store this information for future use, for example, if vehicles start to become equipped with the requisite infrastructure and the threshold processing needs.

However, if the processing system in the target vehicle has the needed processing power, the server may instead determine that the decision to support the light pattern for future purchase and downloads is justified.

Thus, if the support decision in logic block 212 is such that the server has concluded that the target vehicle (or class thereof) is capable of supporting a cloned version of the subject light pattern, then at logic block 214 the server may evaluate the human factors at play (e.g., the desire to have custom patterns and willingness to pay for it) and potential for monetization of the choreography model. As noted, it is likely that in a business model involving the cloning of light patterns or other effects, people that own the subject vehicle would be willing to pay the manufacturer or an affiliate thereof to purchase impressive or unique custom patterns. Thus, in one example, the server may conclude that the pattern should be supported, and a license or ownership fee should be assessed. The monetary advantages of these aspects of the disclosure are likely to be attractive to manufacturers wishing to enhance the scope of services offered to consumers with respect to a category of vehicles.

Referring to logic block 216, the server may decide that the pattern-related data sent from the user of the target vehicle may be archived on a back office repository for future use in creating the subject pattern for selling and cloning on subsequent vehicles. This action enhances the number of available patterns stored in the library, thereby benefiting the manufacturer. As the library at the server and connected database grows, so too will the number of individuals that have compatible vehicles and that make choreographic purchasing decisions. In some embodiments, the input interface or a mobile app on a smartphone may provide an icon allowing the user to browse through different animations compatible with the vehicle. The download and purchase (or lease) of one or more choreographic patterns, including the subject pattern characterized in JSON object 208, may result in an additional revenue stream for the manufacturer, together with the enjoyment attained by the driver in his or her ability to obtain one or more custom light patterns.

FIG. 3 is an example diagram 300 of a JSON payload object 302 according to an embodiment. This particular pattern involves linking different visual and acoustic patterns into one pattern of flashing lights that are emitted during the reproduction of music from the source vehicle's speakers. In other embodiments, the concurrent rendition of the acoustic portion may be requested by the driver via the input interface, if the acoustic portion is recognized and available. As before, the tuples may be concatenated logically in the JSON payload object 302 and transmitted over a wireless network for straightforward interpretation by the server/database of the received metadata. It should be emphasized that JSON objects are but one form of transmitting the relevant data, and that in other configurations different scripts or objects may be used with acceptable results.

With reference to FIG. 3, the pattern ID is 1089, which may be created by the target vehicle to establish an identity that is mapped to the data. The AVAS Correlation value is yes, as described further above. Here again, the Location of the RGB-colored lighting is at the tail lamps of the vehicle. Like the JSON payload object 208 of FIG. 2, the time lapse and geometry of the light pattern are 120 ms and include elliptical contours. Another attribute discovered by the target vehicle, e.g., using a recording or sound sensor, is a musical resource that is reproduced by the source vehicle and recorded (or that is recommended for playback with the light pattern)—in this case, Beethoven's "Fur Elise." This musical piece may play concurrently with the light pattern. "Fur Elise" is just one example of many different attributes for choreographic patterns. Other attributes may include complex animations. To this end, while the JSON payloads illustrated in FIGS. 2 and 3 are short, they may get much larger as other customizations are added, or the light pattern becomes more complicated.

As shown in FIG. 3, the JSON payload object may include other attributes, whether sensed by the processing system during the scanning or added as a customizable preference. The attributes in the form of metadata are sent by the target vehicle to the server or database to determine the presence of one or more matching patterns. The JSON object 302 is reproduced below:

```
Sample JSON Object
{
    "Pattern_Id" : "1089",
    "AVAS Correlation" : "Yes",
    "outcome" : {
        "Location" : "Tail Lamps",
    RGB: (86.3,7.8,23.9)
        "entities" : {
            "Tail Lamp" : {
                "Time Lapse" : "120 ms",
                "Geometry " : "Elliptical Contours"
    "Recommended Musical Resonance"- "Fur Elise"
            }
        },
        "confidence" : 0.997
        }
    }
```

Figure 4:
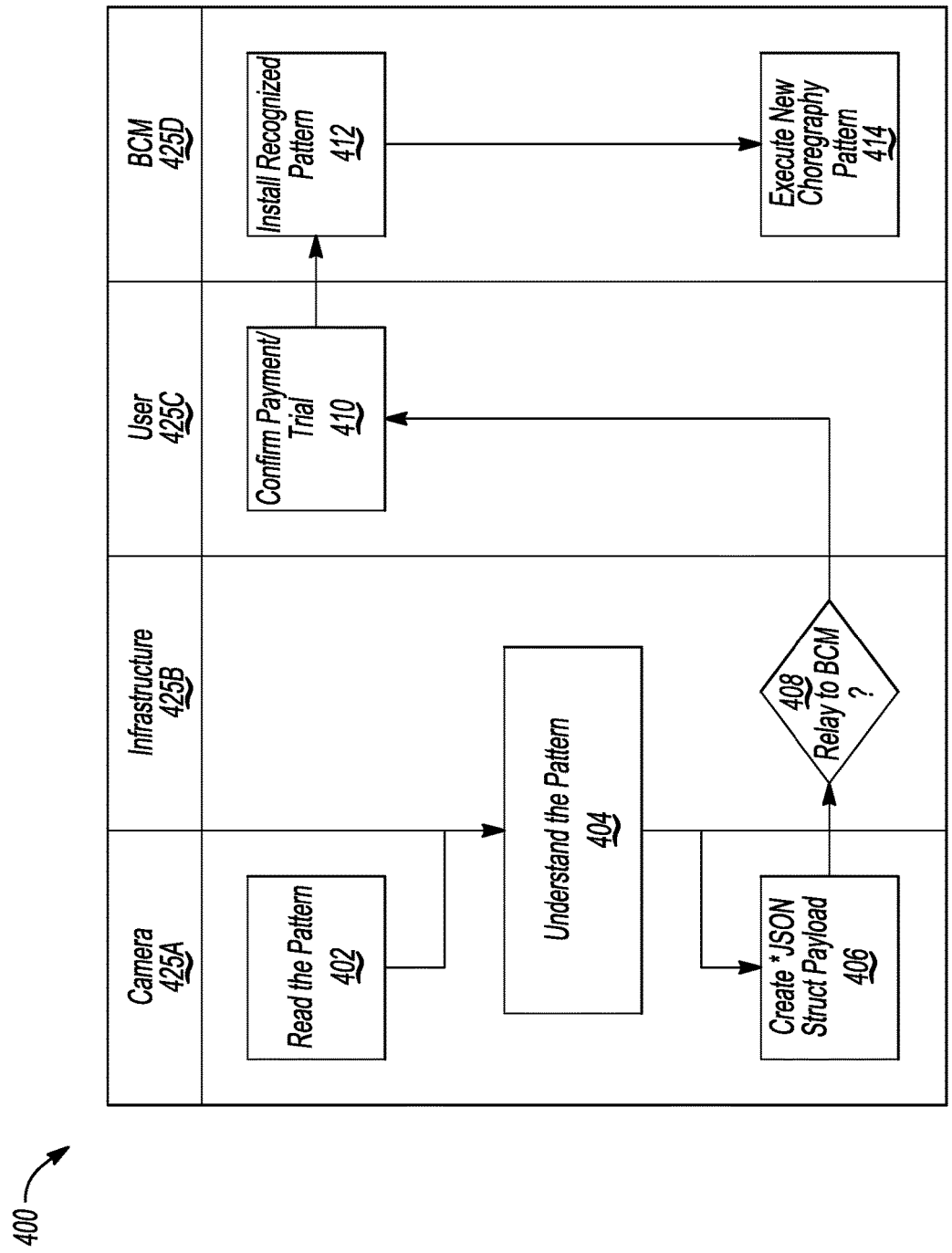
FIG. 4 is a conceptual flow diagram of the various elements of a system for pattern acquisition and relay by a target vehicle according to an embodiment.

FIG. 4 is a conceptual flow diagram 400 of the various elements of a system for pattern acquisition and relay by a target vehicle according to an embodiment. The exemplary implementation in FIG. 4 includes four modules: camera 425A, infrastructure 425B, user 425C, and body control module (BCM) 425D. These four modules represent the four relevant aspects of the illustrated embodiment. Each module 425A, 425B, 425C, and 425D involves different, and sometimes overlapping, functions. The BCM in one embodiment is a multi-faceted ECU or MCU within the vehicle that controls a number of the vehicle's functions. Such functions may ordinarily include opening and closing doors, hatchbacks, controlling dashboard options, and a variety of other possibilities. In this example, the BCM 425D may also be responsible for interfacing with the relevant lights, speakers, and other physical devices to execute the choreography pattern. In some embodiments, the processing system used to duplicate and transmit the initial pattern may also perform the BCM functions for the choreographic and light patterns. In other embodiments, the two systems may be in separate ECUs or MCUs, or they may otherwise be distributed in different positions. In an embodiment where the processing system is distinct from the BCM, the processing system that acquired a light pattern may still provide functions and data to the BCM to enable the BCM to interface with the needed hardware to emit the light pattern. In the embodiment where the processing system and the BCM are part of the same ECU, the basic functions may be similar. In general, the processing system and BCM may control different devices than that of the processing system discussed at length herein, but the process flow is similar in that the BCM may receive and execute the new light pattern at the request of the processing system (e.g., upon the latter receiving an instruction from the driver). In still other embodiments, the processing system or the BCM 425D may be distributed across a number of different ECUs and MCUs. Thus, for purposes of this disclosure, the processing system or the BCM 425D may be spread across different ECUs in the vehicle but may nevertheless function in the manner described.

Referring to FIG. 4, at logic block 402 within the camera 425A environment (which may include other image and non-image sensors), the processing system may use the camera 425A, and one or more additional sensors, to read the pattern. This instruction may be responsive to a request from the driver using the input interface. The camera 425A may position itself to a line-of-sight of the emitted pattern and may initiate a scan of the pattern. The data stream from camera 425A (and from other image or non-image sensors, if applicable) is downloaded to a memory accessible to the processing system. As shown, logic block 404 is part of both the camera environment 425A and the infrastructure 425B, because interpreting the pattern may involve executing code from over-the-air (OTA) updates received in memory by the processing system and interpreting the patterns in the sensor data using pattern recognition code and other executable code. The interpreted patterns may involve tuples of metadata describing the patterns in detail.

Thereupon, at logic block 406, the processing system may create a JSON structural payload in which it encodes the tuples of metadata. As noted above, JSON is merely one non-exhaustive example of how the metadata may be encapsulated and sent. Other mechanisms for encapsulating and/or transmitting the data may be used without departing from the scope of the disclosure. Such non-exhaustive examples may include, but are not limited to, standard XML, BSON, CSV, MessagePack, YAML, Protobuf, Avro, MongoDB, OData, and the like.

At logic block 408 in the infrastructure module 425B, it is determined whether the JSON structural payload or other data files have been relayed to the body control module (BCM). Assuming that the target vehicle is not presently equipped to emit this pattern using the BCM, control may then pass to the user module 425C. At logic block 410, the user may use the input interface to instruct the processing system to send the corresponding metadata to a central server or a database as discussed with respect to previous embodiments. The objective of the user 425C at logic block 410 is to confirm whether the choreographic pattern of interest is present in or accessible to the server, whether in a database repository, non-volatile memory updated by the manufacturer, or otherwise. If the user 425C does in fact receive an indication that the pattern is recognized, present and may be purchased (or leased) for download and use, then the transceiver coupled to the processing system may transmit a message tendering payment, after which a confirmation of the transaction is received.

Referring to logic block 412, if the pattern has been purchased per the instructions input by the driver, the copy is downloaded to the processing system via the transceiver and installed for access to and execution by BCM 425D. Thus, the BCM 425D may install and configure the pattern for use on the target vehicle. It is worth reemphasizing that in some embodiments, the processing system and the BCM may be part of the same system, for example in the same ECU. It is also noteworthy that in some of these embodiments, the BCM code may be executed on the same one or more processors as the processing system. In this latter example, the processing system may be a processor (or plurality thereof) partitioned into a plurality of cores, with each core running threads specific to various purposes (e.g., for the processing system or for the BCM 425D).

At logic block 414, the BCM 425D may initiate and emit the choreographic pattern including the light pattern after receiving a user request relayed by the processing system. The request may be sourced, for instance, from the input interface, as selected by the driver. In some embodiments as noted, the BCM 425D may be interchangeable with or even identical to the processing system, depending on the vehicle architecture. In that embodiment, in addition to controlling the various output devices and lights involved in the choreographic pattern, the BCM may include a portion that controls the sensors and that executes the pattern recognition code and/or other algorithms in a suite of algorithms for acquiring and processing the light pattern and other customizations. In some embodiments, the pattern is tied to an event (e.g., a sudden stop) and automatedly is emitted when the BCM 425D senses an occurrence of the event.

Here again, FIG. 4 demonstrates that a target vehicle that did not initially possess the characteristics needed to implement the choreographic pattern now has the customized pattern that it may emit at the desire of the driver. The infotainment system may also provide an output interface, e.g., on the same face as the touchscreen, for identifying the system status, a schedule during which different lighting patterns may run, or a history of patterns. It is also noteworthy that the attributes of the choreographic system may be sophisticated. The processing system may be tasked with scheduling the light patterns or implementing them in real time, including if specific events such as braking, turning, slowing down, etc., are tied to or associated with specific patterns.

Figure 5:
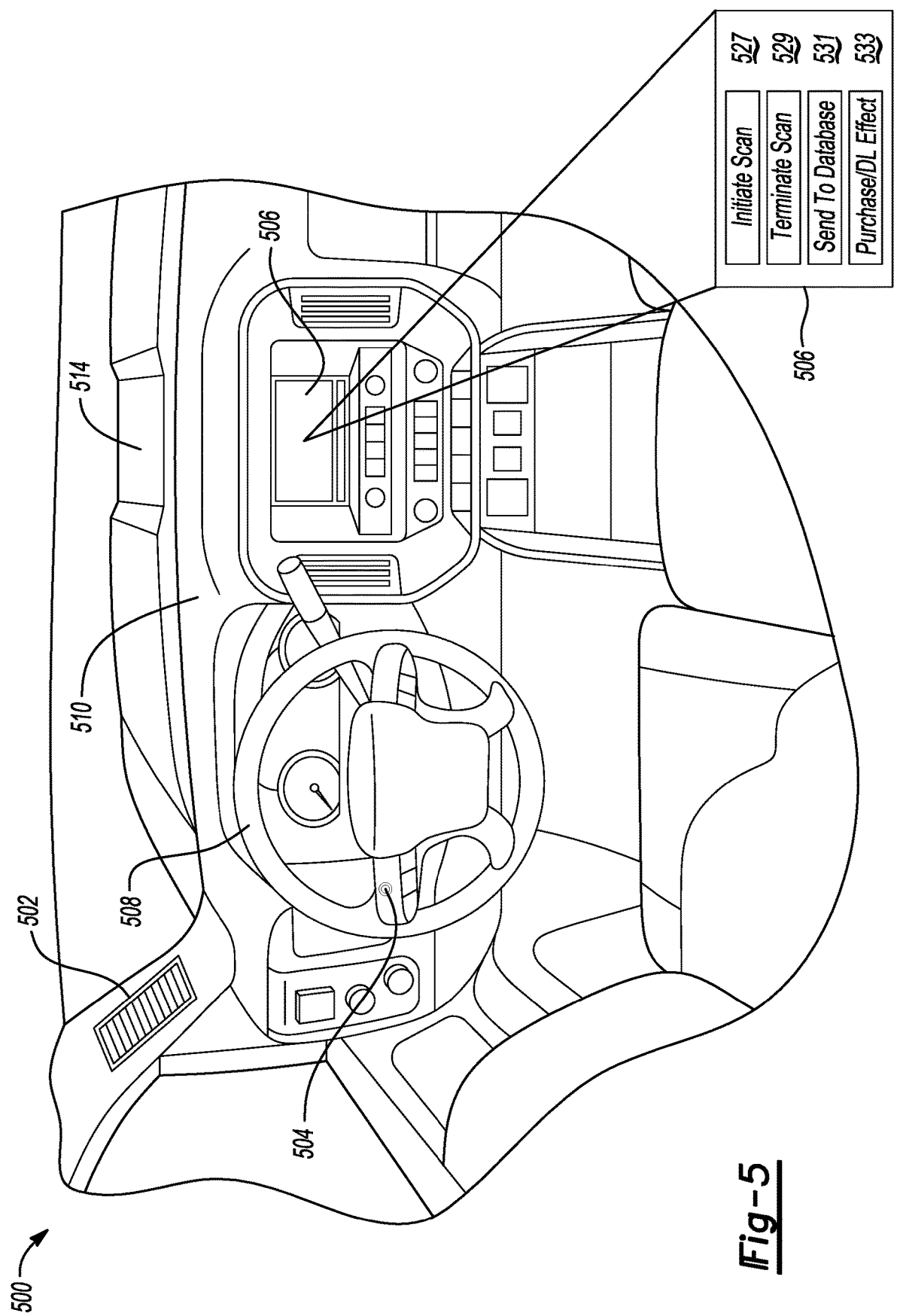
FIG. 5 is an example diagram of a target vehicle's interior dash assembly with an input and output interface for allowing the driver to interact with the search and locate processes, in accordance with an embodiment.

FIG. 5 is an example diagram of a target vehicle's interior dash assembly 500 with an exemplary input and output interface 504 (input interface), 506 (input and output interface) for allowing the driver to interact with the search, locate, purchase, download, and pattern execution processes, in accordance with an embodiment. The interior dash assembly 500 defines in part a body 514 of the vehicle in which certain elements germane to the choreographic pattern may be encased, housed, or arranged. The dash assembly 500 may also include a speaker 502. The speaker 502 may enable the user to listen to different acoustic customizations that the user may decide to integrate with the pattern. In response, the processing system may obtain an OTA update that includes metadata characterizing the customization, which may have been purchased by the user from the server or obtained free of cost. In some embodiments, the customizations may come from the server, or another repository designated by the manufacturer. In other embodiments, the customizations or attributes are defined by, or produced from, the choreographic effect emitted by a source vehicle and captured by the relevant image sensors and acoustic sensors. In either case, the processing system may proceed to process the data, covert it if needed and include it in the payload of a light pattern request.

Referring still to FIG. 5, dashboard 510 may include a steering wheel 508 and a touchscreen 506 which may act both as an input interface and an output interface. In addition, in one embodiment, the button 504 on the steering wheel may be a customizable "quick button" used to quickly emit a desired light pattern after it is downloaded, or to quickly initiate a scan. The touchscreen 506 shows an input interface that includes various icons that the user may select. These include an input selection icon 527 requesting the processing system to initiate a scan of a vehicle in the vicinity emitting a light pattern. The input interface in touchscreen 506 may also give the user latitude to control the scan. For example, touchscreen 506 may include an input selection icon 529 to terminate an existing scan.

After the processing system has scanned the pattern, and the recorded data representing the light pattern (possibly with other attributes obtained using other types of scanners) is ready, the user may select icon 531 which instructs the processing system to send the resulting metadata created based on the scan to a server, database, or similar manufacturer-affiliated location or repository. Further, the user may receive a transmission from the server including a prompt on touchscreen 506 that the light pattern is present in the database. As noted, in these embodiments the touchscreen 506 also acts as an output interface, such as when the touchscreen 506 indicates to the user that the scan is ready to send to the central server, or when the touchscreen 506 indicates to the user that the scan is available for purchase. The touchscreen 506 may thereafter revert to include input functions, or a combination of output illustrations and input selections. While the embodiments herein need not rely on a touchscreen 506 and in some cases may use other inputs like switches, the touchscreen 506 may be useful for simultaneously showing input and output icons, or it may switch between the two.

Referring still to FIG. 5, when the output interface on the touchscreen indicates that the light pattern or other choreographic pattern is available in a memory accessible to the server or on a database, is compatible with the target vehicle and is available for purchase and download (the output interface portion is not explicitly shown), the output interface on touchscreen 506 may revert to an input selection, such as input icon 533. The user may select icon 533 to enable the user to purchase the light pattern online, or via a preexisting account with the manufacturer, and to download the pattern. The code in the processing system may further be equipped to connect the user to a call with a customer representative on the manufacturer's side to consummate the purchase. In some embodiments, the user may have an existing account for customizations of this sort. In this case, the touchscreen 506 may display data received from the server or from live personnel prompting the user to make the purchase and enabling the user to call with other questions.

The output interface may also identify instances where the desired light pattern is not present or available for download, or where it is not compatible with the hardware equipped on the target vehicle. In this case, the server may stream data to the output interface recommending a similar customization or suggesting other alternatives. The appropriate input icons for making such selections may be provided. In the case where the infotainment system includes at least two touchscreens, it is noteworthy that the output interface may appear on one touchscreen and the input interface may appear on another touchscreen. In various embodiments, the user may also be presented (on request or otherwise) with suggested acoustic customizations over the speaker 502. In some cases, the pattern may be implemented in more than one location (including an input portion of the vehicle, so that the output and input interfaces may indicate the possible locations where the relevant portion of lights are and the input selections for implementing the user's choices. Meanwhile, when the user requests (or a specified event triggers) initiation of a light pattern, the processing system may provide the select BCM with the appropriate code for implementing it. In other embodiments, the processing system may pass the executable code for implementing the light pattern with the correct attributes and an accompanying acoustic effect to the BCM as soon as the processing system receives it from the transceiver. As noted previously, in some embodiments, the processing system may be integrated with one or more BCM modules such that the code may be immediately provided to the BCM module(s) as it is passed to the processing system interacting with the server.

In one embodiment the touchscreen 506 and input button 504 along with other controls related to the acquisition and implementation of the choreographic pattern system may be hardwired behind the dashboard 510 to the processing system, which may be included in one or more ECUs, MCUs, or independently arranged such as in a software controlled vehicle where a single processor or set of processors may execute the code for the automobile. Thus, this is one way in which the input interface may be coupled to the processing system. It should also be noted that the body of the vehicle may include various locations, including in the main cabin, the location(s) near the engine, underneath the seat, in the posterior of the car, etc., where the space is enclosed by the main structural elements of the vehicle. This means that, for purposes of the specification, the body may include the driver and passenger area, and a mobile device within the body may be deemed positioned or otherwise encased or arranged in the body where one of the embodiments involving the mobile device is presented above.

FIG. 6 is an example block diagram of a choreographic pattern acquisition and emission system 600, and more specifically processing system 617 encased in a body of the vehicle along with a transceiver 615, combinational logic 659, volatile memory (e.g., DRAM 611), non-volatile memory 688, and an image processing engine 637 (also called a BCM engine), in accordance with an embodiment. It will be appreciated that the terms "processing system," "processor," and "image processing engine" for purposes of this disclosure may, but need not, be limited to a single processor or integrated circuit. Rather, they may encompass plural or multiple processors, configured in a variety of possible physical circuit configurations. They may be encased in one or more ECUs, MCUs, or other physical platforms, such as those more specific to a software-defined vehicle. Non-exhaustive examples of the term "processor" include (1) one or more processors, in a vehicle for customizable choreographic system implementations that collectively perform the set of functions relevant to reproducing and acquiring a choreographic pattern, and that interface with other components (e.g., the image processing (BCM) engine 637) to execute that pattern using the manufacturer's suite of algorithms and hardware, and (2) processors of potentially different types, including reduced instruction set computer (RISC)-based processors, complex instruction-set computer (CISC)-based processors, multi-core processors, etc.

The processing system 617 may further include memory (e.g., volatile dynamic or static random access memory (e.g., DRAM 611 or "SRAM")). DRAM 611 may be used in some implementations for quickly storing data streams from one or more sensors during a scan, or for storing executable code for running the pattern recognition and other software functions, including BCM related code for controlling the lights and speakers that may emit the acquired patterns. While the embodiment of FIG. 6 shows that processing system 617 is coupled to and cooperates with image processing engine 637, which in turn is coupled via memory interface circuit 635 to DRAM 611 and non-volatile memory 688, the latter for persistent code and data storage, in other implementations the various modules may be partitioned in a different manner without departing from the scope and spirit of the present disclosure. In some embodiments, the processing system 617 may be coupled to solid state drives, magnetic disk drives and other hard drives. The processing system 617 may also incorporate flash memory including NAND memory, NOR memory and other types of available memory for achieving fast reads and writes that enjoy a nonvolatile format. The processing system 617 may also include read only memory (ROM), programmable ROM, electrically erasable ROM (EEROM), and other available types of ROM. The processing system 617 and the operating system and other applications relevant to the pattern acquisition and emission system 600 may be updatable, wirelessly via OTA updates or otherwise. As noted, the memory (e.g., DRAM 611) in the processing system 617 may further include one or more cache memories, which may also be integrated into one or more individual processors/central processing units (CPUs) as L1 caches. The caches may be embedded within the processor, or they may be discrete devices, or some combination thereof.

The processing system 617 in some implementations may include a system-on-a-chip (SoC) architecture, or more than one SoC for performing resolute or distributed functions. The processing system 617 in this disclosure is not restricted to a purely software architecture and in some embodiments processing system 617 may include hardware implementations such as digital signal processors (DSPs), application-specific integrated circuits (ASICs), field programmable gate arrays (FPGAs), discrete combinational logic circuits including combinational logic 659, and the like. In these configurations, the processors may be coupled together via different circuit boards to form the processing system 617. In other embodiments, the processors and other functional modules may be combined on a single-printed circuit board or integrated circuit device.

In this exemplary embodiment, processing system 617 includes three processors 631A, 631B, and 631C, although another number of processors may equally-suitably be used. Processor 631A includes a central processing unit or CPU 627A. Within CPU 627A are the arithmetic logic unit and a floating point units. Other typical units, e.g., a fixed point unit, registers sets and the like, are present but are omitted here to avoid unduly obscuring the concepts and features of the disclosure. Coupled to CPU 627A is level 1 (L1) or primary cache memory 629A for storing and providing most commonly used data and code to and from CPU 627A very quickly. Processing system 617 further includes processor 631B, which in turn includes CPU 627B, the CPU having (among other features) another arithmetic logic unit for parallel operations and a floating point unit for fast, efficient and accurate calculations. Level 1 ("L1) cache 629B is coupled to CPU 627B for reading and writing the most commonly used data at high speed. Processing system 617 includes another parallel processor 631C. Processor 631C includes another CPU 627C for performing parallel calculations using features like the arithmetic logic unit, the floating point unit, and elements not specifically shown. CPU 627C is coupled to L1 cache 629C for performing primary operations of the most commonly used data and code. Data and details from the three caches in the system of three processors 631A, 631B, and 631C may be transmitted to DRAM 611 or to non-volatile memory 688 for more permanent storage. In addition, the three processors 631A, 631B, and 631C are coupled together with the transceiver 615 and a high speed memory interface 635 for enabling the fast transfer of processed data to the various components.

While three processors are shown in FIG. 6 for performing the needed functions relevant primarily to choreographic pattern acquisition, another number of processors may be used, from a single processor to a plurality of processors which may be greater or less than three. Thus, the architecture of the processing system 617 shown in FIG. 6 is exemplary in nature.

A crystal oscillator (X-OSC) 694 is shown attached to the memory interface 635 and hence the three processors 631A, 631B, and 631C. The crystal oscillator (X-OSC) 694 may be used for clock operations, such as in the timing of received or transmitted signals. Separately, combinational logic 659 is shown for performing various digital hardware tasks. Data may be exchanged between the combinational logic 659 and the other components of the processing system 617 using bus 679, which is assumed in FIG. 6 to extend across the elements of processing system 617. Combinational logic 659 may include one or more encoders, decoders, multiplexers, demultiplexers, Boolean logic circuits, and other digital hardware elements for executing various digital features in hardware. In some embodiments, the combinational logic 659 may be realized as including one or more field programmable gate arrays or other digital circuit types.

Integral to processing system 617 but separate from it in this embodiment is image processing engine or BCM engine 637. Image processing engine 637 may work closely in connection with processing system 617 for choreographic light patterns and the attributes related thereto (discussed in more detail herein). The image processing engine 637 may, depending on the implementation, be part of processing system 617, or partially intertwined physically, logically and functionally with processing system 617, or it may adopt some physical and functional definition in between. Processing system 617 is hardwired or otherwise coupled in duplex to the various input sensors and acoustic systems (as applicable) positioned on the vehicle (see, e.g., FIG. 1) for (1) positioning the sensors if needed, controlling aspects of the sensors such as light intensities, scaling, etc. and overall coordinating a scan and recording of a line-of-sight choreographic vehicle light pattern, for (2) receiving image data, image-related data, acoustic data, etc. and other attribute-related data emitted from a prescribed light pattern and received by the relevant sensors for describing the scan, (3) recording, identifying and converting the data using pattern recognition algorithms and other code for combining the raw data and converting it into a more palatable, potentially human-readable tuples of metadata that may be placed into transmit payloads for transmission to a server or database under control of the manufacturer or affiliate thereof, (4) sending the data for transmission via a transceiver, and (5) receiving and analyzing the responsive data from the server, (6) controlling the input and output interface to enable the user or driver to make the decisions regarding the patterns and purchases as they become available, and (7) coordinating received patterns with the image processing (BCM) engine for reproduction response to user input or to an event with which it may be associated. The processing system 617 performs a number of other functions described in other parts of this disclosure.

The image processing engine 637 may be responsible for assisting in this embodiment by emitting the replicated pattern. The image processing engine 637 may render functional features and icons on the output/input display, or just the display 655. Image processing engine 637 may be wired to the lights, LEDs, Smart Glass, and other components, elements and infrastructure responsible for emitting the light pattern(s) or the overall choreographic patterns, and to do so either at the occurrence of an event (e.g., accelerating suddenly) that may necessitate the pattern or to do so upon instruction of the user (such as for aesthetic purposes while cruising).

In this embodiment, image processing engine 637 is a processing system that emits the choreographic patterns provided it over bus 679 from the processing system, but that also coordinates its functions with the processing system 617, particularly where acoustic patterns are needed, and the choreographic emissions become complex. In some embodiments such as the emerging set of software-defined computers, the processing system 617 may be even more a part of the image processing engine 637 for quickly emitting complex patterns using the available hardware as well as the code recognition patterns and acoustic patterns that may stem from the overall choreographic pattern (or that may be independently overlaid and customized for use by the driver with the pattern). The image processing engine 637 is coupled to the memory interface 635 to enable it to perform or receive high-bandwidth transfers from the processing system 617 and its components. In this embodiment, image processing engine 637 is coupled to display 655 (which may constitute one or more touchscreens or other controls) for identifying results and prompts, and for eliciting user input, although in other embodiments, these features may be performed by the processing system 617. While not shown to avoid unnecessarily obscuring the concepts of the disclosure, image processing engine 637 is also coupled with the controllers of the relevant LEDs and other pattern recognition producers at various portions of the exterior and interior of the vehicle to ultimately allow the vehicle to emit the choreographic patterns that were initially elicited from a source vehicle (or that are contained in an online catalogue, for example).

The transceiver 615 may be coupled with the processing system and the image processing engine 637 via bus 679. The transceiver may include different interface technologies encoded in it. For example, a 5G interface circuit 619 is illustrated for facilitating 5G-capable transmissions between the transceiver and another vehicle using the vehicle antenna 651 (or in some embodiments, the antenna of a smartphone or mobile device). Transceiver 651 is not limited to 5G, and it may have interface circuitry sufficient to enable support for 3G/4G and related infrastructures, as well as support for proprietary manufacturer-centric networks in embodiments where they are used. Transceiver 615 also includes a wireless transmit/receive (WL TX/RX) circuit 625, which may include the analog and digital transceiver hardware for receiving and transmitting signals (such as encapsulated JSON objects) from and to processing system 617.

In addition, cable 623A may include a plurality of wired connections for use by the processing system 617 or the image processing engine 637. For example, one such wire may include an input signal to the processing system 617 from one of the cameras initiating a scan of a source vehicle. Another wire in cable 623A may be used to couple an array of LEDs to the image processing engine 637 for emitting the pattern. Interface 621A may include multiplexers, comparators, and other circuit components for properly interfacing these hardwired signals with their respective sources and destinations. In some embodiments, interface 621A may also be used to connect different wires to the WL TX/RX circuit 625, to enable the circuit 625 to assist in using the crystal oscillator or X-OSC 694 to recover timing information, or to transmit data encoded using a signal timed via the X-OSC 694, etc. The physical hardware may vary widely depending on the implementation to achieve the objectives of the present disclosure. In some embodiments, cable 623A may also include wires coupled to the main antenna(s) of the target vehicle, in order to use the higher power of the main antenna to receive signals with a higher signal-to-noise ratio and to transmit signals to a central server or database (e.g., a signal from the processing system) that is farther away. To this end, either interface 621A or WL TX/RX module 625 may include one or more amplifiers for boosting the power of outgoing signals and other existing circuit elements such as analog-to-digital converters for converting analog signals from various sensors into digital signals.

While one cable connector 623A is shown including multiple conductors within for routing to lights, audio circuits, and sensors, in other embodiments a different number or configuration of cables may be used. Further, multiple circuit boards may be used for routing wires to lights, speakers, and microcontrollers to emit a choreographic pattern including a light pattern, and to sensors such as cameras for generating a representation of a pattern from a source vehicle.

The above controllers or circuits to which the image processing engine may connect includes exterior lighting, including colors. In some embodiments, processing system 617 of a target vehicle scan the lighting pattern of a source vehicle and make an initial determination whether the target vehicle's infrastructure supports it. If not, processing system 617 may abort the scan on this ground, and message the user accordingly. As noted, exterior light patterns may be triggered based on an event that may or may not be enabled by a user via the input interface. For example, a certain light pattern may be an enabler for messages like the occurrence of a minor incident or "fender bender." A different choreographic pattern may indicate a mechanical breakdown. Yet another pattern may represent hazard lamps, distress or SOS situations, or some other coded messages which may be a facilitator for those messages. In these embodiments, the principal focus is on the exterior lighting. However, some non-conflicting interior light patterns may be principally or purely aesthetic, and the principles of the present disclosure are intended to cover these aspects as well.

While FIG. 6 shows an image processing engine, it should be emphasized that several types of image sensors exist (e.g., LIDAR, RADAR, CMOS detectors, video sensors and the like) and may be used for purposes of establishing choreographic patterns. In the present disclosure, a target vehicle that does not initially possess the customization of a source vehicle may leverage its camera system and proprietary pattern recognition algorithms to identify whether this particular pattern exists in a centralized database, to receive offers for trial use or purchase, and to download choreographic patterns including light patterns.

In some embodiments, to ensure case of hardware compatibility, the vehicles may concentrate on the same make and model, although in future software-defined vehicles, further dynamic or temporary customization of the vehicle may lessen, if not obviate, this need. The system included in various embodiments include a target vehicle with cameras, sensors, camera modules and associated ECU's and MCU's that may be triggered to capture and process data. Infotainment systems in more flagship vehicle offerings may be connected to a central database to search and match existing offerings, rendering a scan of an arbitrary source vehicle not needed in some instances. The infotainment system may have a wide and diverse set of input icons and output displays for providing more choices along with more relevant information to the driver or other user. For example, one embodiment may employ a choreography application built within the infotainment system to enable a user to customize a desired choreography within the confines of the vehicle's hardware. Similarly, in some embodiments, choreography applications for the infotainment system may be available on an application store of the manufacturer (or affiliate) to enable the user to search for, purchase, and download and the desired effect, which may then be applied on relevant portions of the vehicle's exterior (or interior).

Smartphones in some embodiments likewise may be equipped with vehicle manufacturer-specific applications that may also extend and include the feature to search for, purchase and apply the update to the vehicle. As previously noted, call center systems of particular manufacturers may be customized to accept handoffs from target vehicles seeking to customize their possible light effects.

For vehicles, the algorithms provided for image detection and pattern recognition should not interfere with existing level-1 camera operations intrinsically supplied with the vehicle. Such level-1 operations may include security and incident-avoidance algorithms, such as rear view or blind spot camera operations, and the like. Typically, the initiation of the code's execution is at the behest of the user, who may use the input interface to begin scanning each of the vehicles' lighting and patterns and continue the scanning and recording operations for a sufficiently long time period to successfully capture the pattern representations. The algorithm may ideally map the colors of the lights, identify whether they are emitted from the front or rear of the vehicle, and also analyze and identify the pattern(s) of the lighting. Various algorithms may be used for pattern recognition. Select ones include Motion Vectors, K Means Algorithm, and the like. The pattern JSONs or other payload objects, and compatibility criteria for each make and model may ideally be archived on the back office. In some embodiments, mobile application features may be used to enhance the display and offer for purchase of a light pattern, along with the vehicle-specific choreography options. Ecosystems including a specific application store may offer captive (Manufacturer) as well as Third-Party offerings for the customizations and personalization of the various patterns.

In another example, the infotainment system of the target vehicle may be preconfigured with the ability to connect to a central database and application stores to not just match and offer the pattern as discussed above, but also to apply targeted choreography to the existing pattern, The present disclosure offer significant advantages via the ability to scan and detect another vehicle's custom choreographic effect. The target vehicle may clone and replicate the effect by transmitting the data to a server. The latter may search for available customizations that the manufacturer maintains and offers, such as for a trial period prior to purchasing it.

This method has potential for a new revenue channel for the vehicle manufacturer long after the initial sale of the vehicle. This channel relies on creative and technical modifications to existing applications. Additional third-party developers and tuners may also offer their own customizations provided that the manufacturer exposes the application programming interface (API) to developers and offers a marketplace where these customizations may be uploaded and offered for sale. This will usher in a new era of customization and personalization for vehicles. Different vehicles may be equipped with specific musical and visual effects, which may be further customized by the user.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A vehicle, comprising:
    a body having a processing system therein;
    an input interface coupled to the processing system and accessible to a user; and
    an image sensor positioned on the body for capturing data from a source, wherein the processing system is configured to:
        initiate, responsive to user input from the input interface, a scan for identifying and recording a choreographic light pattern emitted by an exterior portion of another vehicle in a line of sight of the vehicle, the scan using data from the image sensor and pattern recognition code;
        convert the identified light pattern and relevant attributes thereto into metadata;
        transmit, via a wireless transceiver coupled to the processing system, the metadata to a central database to determine whether a matching light pattern exists in the database; and
        receive, via the wireless transceiver, data identifying that a match in the database exists for prospective acquisition by the processing system and selective emission by the vehicle;
        responsive to a prompt received via the wireless transceiver from the central database, the processing system is configured to initiate, based on the user selection via the input interface, a purchase, lease, or when available, a cost-free acquisition of the matching light pattern from the central database for use on the vehicle; and
        download data comprising the matching light pattern from the central database and to emit, responsive to the user selection received from the input interface, the matching light pattern on an exterior portion of the vehicle using lights positioned at an orientation and location specified by the downloaded data.

2. The vehicle of claim 1, wherein the relevant attributes to the identified light pattern include one or more of accompanying sound effects, use of Smart Glass, lighting location, lighting event, an animation including a category and time window thereof, hue information, brightness, inter-step time lapse, orientation, or geometrical pattern.

3. The vehicle of claim 1, wherein when the data indicates that the matching light pattern exists, the processing system is configured to receive information identifying that the matching light pattern is compatible, and available for use, with the vehicle.

4. The vehicle of claim 3, wherein the received information identifying that the matching light pattern is compatible with the vehicle is based on vehicle make and model data archived in a memory accessible to the central database.

5. The vehicle of claim 1, wherein the processing system is further configured to embed the metadata identifying the light pattern to the central database in a payload object.

6. The vehicle of claim 1, wherein the processing system comprises a mobile device configured to execute one or more mobile applications directed to the scan of the another vehicle and to communications with the central database, the mobile device being electrically coupled with the image sensor, wherein the input interface comprises a touchpad or touchscreen of the mobile device.

7. The vehicle of claim 1, wherein the metadata further includes one or more colors mapped by the processing system to lights in the light pattern, a relative position of the light pattern including whether the light pattern is in a front or rear of the another vehicle, or periodic changes to the light pattern.

8. The vehicle of claim 1, wherein a duration of the scan of the light pattern emitted from the another vehicle is selected by the user from the input interface.

9. A system, comprising:
a source vehicle configured to emit an exterior choreography effect including a light pattern from an external surface portion thereof;
a target vehicle not presently configured to emit the light pattern, wherein the target vehicle includes a processing system encased therein, a driver of the target vehicle witnesses the light pattern emitted from the source vehicle, and responsive to the processing system receiving an instruction from the driver via an input interface coupled to the processing system, the processing system initiates a scan of the source vehicle using at least one image sensor to capture a representation of the light pattern from the source vehicle while the target vehicle is in a line of sight of the source vehicle;
a server to which the processing system is configured to transmit metadata representing the captured representation of the light pattern from the source vehicle over a wireless network, wherein the server uses the metadata to conduct a search for a match to the captured representation in a memory, and in response to finding a match, the server is configured to determine whether the light pattern found in the memory is compatible for use with the target vehicle;
wherein the server is configured to determine whether the light pattern and any accompanying choreographic effects are available to the server in a memory, are compatible with the target vehicle, and are available for use or rental by, or sale to, the driver; and
wherein upon determining that the light pattern and any accompanying choreographic effects in the memory are available for use or rental by, or sale to, the driver, the server is configured to communicate with the processing system of the target vehicle to prompt the driver to pay a rental or purchase fee where necessary and to download the light pattern found in the memory; and
wherein, after the download, the processing system is configured to emit the light pattern upon receiving an instruction from the driver via the input interface, the processing system being configured to use lights affixed to or inset in a corresponding external surface portion of the target vehicle along with attributes from the download relevant to execution of the light pattern.

10. The system of claim 9, wherein:
the target vehicle further includes one or more acoustic sensors configured to detect one or more choreographic sound effects accompanying the light pattern during the scan; and
the processing system is configured to convert information defining the sound effects along with the light pattern into the metadata for transmission to the server.

11. The system of claim 9, wherein the processing system is configured to identify the light pattern emitted by the source vehicle based on a plurality of attributes of the light pattern and to convert the light pattern to metadata comprising the captured representation of the light pattern conveyed to the server.

12. The system of claim 9, wherein the target and source vehicles comprise a make and model based on similar vehicle body types or similar vehicle body suggestions.

13. The system of claim 9, wherein the at least one image sensor includes one or more cameras or sensors electrically coupled to the processing system for enabling the processing system to capture a representation of the light pattern from the source vehicle.

14. The system of claim 13, wherein the processing system is included in one or more electronic control units (ECUs) or microcontroller units (MCUs) coupled to a body of the vehicle and configured to receive data from the one or more cameras or sensors during initiation of the scan of the source vehicle to capture the representation of the light pattern.

15. The system of claim 13, wherein the processing system comprises a mobile device including a memory for storing executable code and a processor that, when executing the code, causes the mobile device to receive data from the one or more cameras or sensors for enabling the mobile device to capture a representation of the light pattern from the source vehicle, to forward the captured representation to the server, to receive a response from the server identifying whether a matching light pattern is found, and to apply the light pattern to the target vehicle when the light pattern is available from the server and compatible with the target vehicle.

16. A method of a target vehicle, comprising:
detecting a source vehicle emitting a choreographic effect including a light pattern from a position on or within the vehicle;
recording data relevant to the light pattern from one or more cameras or sensors on the target vehicle in a line-of-sight of the source vehicle;
identifying the light pattern using the data and pattern recognition code for interpreting the light pattern based in part on an orientation of emitted light;
converting the light pattern to metadata;
transmitting the metadata to a central database to determine whether a matching light pattern exists in the central database;
receiving a prompt when a match is found in the central database, the prompt indicating whether the light pattern exists for prospective acquisition, is compatible with the target vehicle, and is available for download, trial or purchase;
initiating responsive to a prompt received via a wireless transceiver from the central database based on a user selection via an input interface on the target vehicle, a purchase, lease, or when available, a cost-free acquisition of the matching light pattern from the central database for use on the vehicle;
downloading data comprising the matching light pattern from the central database; and
emitting, responsive to the user selection received from the input interface, the matching light pattern on an exterior portion of the vehicle using lights positioned at an orientation and location specified by the downloaded data.

17. The method of claim 16, including mapping a source of the light pattern with a radar sensor on the target vehicle.

18. The system of claim 9, wherein the target vehicle includes a radar sensor for mapping a source of the light pattern.

19. The system of claim 9, wherein the target vehicle and the source vehicle each include an array of LEDs in matching relative positions.

20. The vehicle of claim 1, including a radar sensor configured to map a source of the choreographic light pattern.

* * * * *